(12) United States Patent
Ruge

(10) Patent No.: US 7,450,129 B2
(45) Date of Patent: Nov. 11, 2008

(54) COMPRESSION OF STREAMS OF RENDERING COMMANDS

(75) Inventor: Thomas Ruge, Oakland, CA (US)

(73) Assignee: NVIDIA Corporation, Santa Clara, CA (US)

(*) Notice: Subject to any disclaimer, the term of this patent is extended or adjusted under 35 U.S.C. 154(b) by 105 days.

(21) Appl. No.: 11/412,413

(22) Filed: Apr. 26, 2006

(65) Prior Publication Data

US 2006/0248571 A1  Nov. 2, 2006

Related U.S. Application Data

(60) Provisional application No. 60/676,241, filed on Apr. 29, 2005, provisional application No. 60/676,254, filed on Apr. 29, 2005, provisional application No. 60/676,240, filed on Apr. 29, 2005.

(51) Int. Cl.
*G06T 1/00* (2006.01)
*G06F 7/00* (2006.01)

(52) U.S. Cl. .................... 345/522; 707/101
(58) Field of Classification Search ............ 345/522
See application file for complete search history.

(56) References Cited

U.S. PATENT DOCUMENTS

| | | | |
|---|---|---|---|
| 5,182,797 A | 1/1993 | Liang et al. | |
| 5,265,203 A | 11/1993 | Peaslee et al. | |
| 5,371,849 A | 12/1994 | Peaslee et al. | |
| 5,377,329 A * | 12/1994 | Seitz | 710/54 |
| 5,398,315 A | 3/1995 | Johnson et al. | |
| 5,548,737 A | 8/1996 | Edrington et al. | |
| 5,655,120 A | 8/1997 | Witte et al. | |
| 5,701,468 A * | 12/1997 | Benayoun et al. | 707/101 |
| 5,714,997 A | 2/1998 | Anderson | |
| 5,745,125 A | 4/1998 | Deering et al. | |
| 5,872,972 A | 2/1999 | Boland et al. | |
| 5,896,139 A | 4/1999 | Strauss | |
| 6,128,642 A | 10/2000 | Doraswamy et al. | |
| 6,243,107 B1 | 6/2001 | Valtin et al. | |
| 6,292,200 B1 | 9/2001 | Bowen et al. | |
| 6,292,822 B1 | 9/2001 | Hardwick | |
| 6,373,977 B1 | 4/2002 | Culbertson | |
| 6,438,576 B1 | 8/2002 | Huang et al. | |
| 6,459,429 B1 | 10/2002 | Deering | |
| 2002/0002587 A1 | 1/2002 | Kecik et al. | |
| 2003/0189574 A1 | 10/2003 | Ramsey | |
| 2003/0191860 A1 | 10/2003 | Gadepalli et al. | |
| 2005/0129323 A1 * | 6/2005 | Glickman | 382/240 |
| 2006/0195464 A1 * | 8/2006 | Guo | 707/101 |

FOREIGN PATENT DOCUMENTS

CN  01813014.3  6/2005
WO  WO 02/07449 A2  1/2002

* cited by examiner

*Primary Examiner*—Xiao M Wu
*Assistant Examiner*—Jacinta Crawford
(74) *Attorney, Agent, or Firm*—Zilka-Kotab, PC

(57) ABSTRACT

A distributed rendering system with compression of streams of rendering commands. The controlling device 110 fits streams of rendering commands to the rendering devices 120 within the frame duration by distributing compressed streams. Streams are compressed by caching relatively duplicative sequences of rendering commands. To provide additional efficiency, textures that are mapped to 3D objects can be stored at the rendering devices 120 such that they do not need to be sent from a controlling device 110 everytime the rendering device 120 needs them. Also, long chains of individual vertex calls can be converted on the fly into vertex arrays.

18 Claims, 3 Drawing Sheets

COMPRESSION OF STREAMS OF RENDERING COMMANDS

BACKGROUND OF THE INVENTION

1. Field of the Invention

The invention relates to compression of streams of rendering commands.

2. Related Art

In some applications of computing devices, it is desirable to present a visualization of a scene to a user. Some of these applications include the following:

- CAD (computer aided design);
- computer aided search, such as used in the oil and gas industry;
- computer simulations, such as battlefield simulations and flight simulation; and
- video games, including multiplayer video games.

One problem in the known art is that computing the scene to be presented requires relatively large resources, including both computing power and memory.

Known solutions include breaking up computing the scene into parts, and assigning each of those parts to a separate graphics processor. These separate graphics processors each operate under control of a single controlling processor, which determines how to break up computing the scene into parts. The controlling processor sends each separate graphics processor a set of commands telling the receiver what to render. Each graphics processor generates data showing how to render its part of the scene. This data might be sent back to the controlling processor for presentation, or might be sent on to a presenting device, such as a graphics compositor, a monitor, or a set of monitors.

While this method generally achieves the goal of providing increased resources to render the scene, it still has several drawbacks. One drawback is that it might take different amounts of time to send rendering commands to distinct graphics processors. For example, if one of the graphics processors is assigned more objects to render than others, that one graphics processor will receive a relatively larger set of rendering commands. Known systems generally provide for presenting all the rendering results at the same time. This has the effect that all graphics processors receive their rendering commands, and render their objects, before their new results can be presented.

Known systems sometimes account for the difference in completion time by double (or multiple) buffering of frames to be presented. That is, there is a frame that is currently being presented to the user, and one or more "hidden" frames being written to by the graphics processors as they render their objects. The "frame rate", that is, the rate at which frames can be generated is limited by the rate at which the hidden frames can be updated by the graphics processors. This has the effect that the rate at which frames (of a changing scene, such as a motion picture) can be generated is limited by the longest amount of time it takes to send rendering commands to one of the graphics processors.

A second known problem in the art is mapping a complex surface onto 3D geometry.

A known solution for mapping a complex surface (aka a texture) onto 3D geometry is for the controlling device to send the texture to the rendering device(s) every time the rendering device(s) need the texture, however, this takes a significant amount of time and slows down the rendering process.

A third known problem is providing an efficient method for storing and converting vertex calls into vertex arrays.

A known solution is found in modern 3D languages or SDK's (Software Development Kits) that provide efficient ways to store large amounts of vertices in Arrays (Vertex Arrays), however, 3D applications often use individual vertex calls which is inefficient (i.e. it takes long time) due to their large size compared to vertex arrays.

Accordingly, it would be advantageous to provide methods and systems in which 3D scenes might be rapidly rendered, and which are not subject to drawbacks of the known art.

SUMMARY OF THE INVENTION

The invention provides techniques, embodied in methods and systems, including compression of streams of rendering commands.

A system embodying the invention includes a controlling device and a set of rendering devices, with the effect that the controlling device can distribute a set of objects to be rendered to the rendering devices. The controlling device attempts to send a compressed form of the stream of rendering commands, with the effect that network bandwidth permits relatively large streams of rendering commands to be sent to all rendering devices within each frame's duration.

In one embodiment, in the event that a sequence of rendering commands to be sent to a rendering device is similar to an earlier such sequence, the controlling device sends a compressed form of that particular sequence.

In one embodiment, the controlling device causes each stream of rendering commands to be compressed by caching sequences of rendering commands that are relatively duplicative of earlier such sequences. For a first example, if a scene to be rendered includes one moving object within a background of 3D scenery, the controlling device can send a relatively short command to each rendering device, saying "render the same scenery", and separately send other commands with respect to rendering the moving object. For a second example, if a scene to be rendered includes one moving object within a background of 3D scenery, the controlling device can send a relatively short command to each rendering device, saying "render the moving object, only in a different place" (or viewing angle, or other parameters).

In an embodiment of the invention, textures used by rendering devices are cached at the devices, so that the controlling device need only send a reference to the rendering devices to use a texture rather than sending the texture itself. Essentially this can be considered a compression technique, as substantial time is saved.

In an embodiment of the invention, long chains of individual vertex calls can be converted on the fly into vertex arrays which reduce the amount of vertex data that the controlling device has to send to rendering devices.

After reading this application, those skilled in the art would recognize that the invention provides an enabling technology by which substantial advance is made in the art of rendering scenes.

For example, the invention might be used to provide one or more of, or some combination or extension of, any of the following.

- rendering 3D scenes in substantially real-time, such as for example as might be used in battlefield simulations, flight simulations, other testing or training devices, and the like;
- rendering 3D scenes in various detail and from various selected perspectives, such as for example as might be used in computer-aided design, in examination of computer simulations of natural phenomena such as weather simulations or wind-tunnel simulations, and the like; and rendering 3D scenes to present information, such as for example as might be used in computer-aided presentation or search of databases, user interfaces for computer-aided control of real-time systems or other systems, and the like.

After reading this application, these and other and further uses of the invention would be clear to those skilled in the art.

INCORPORATED DISCLOSURES

Figure 1:
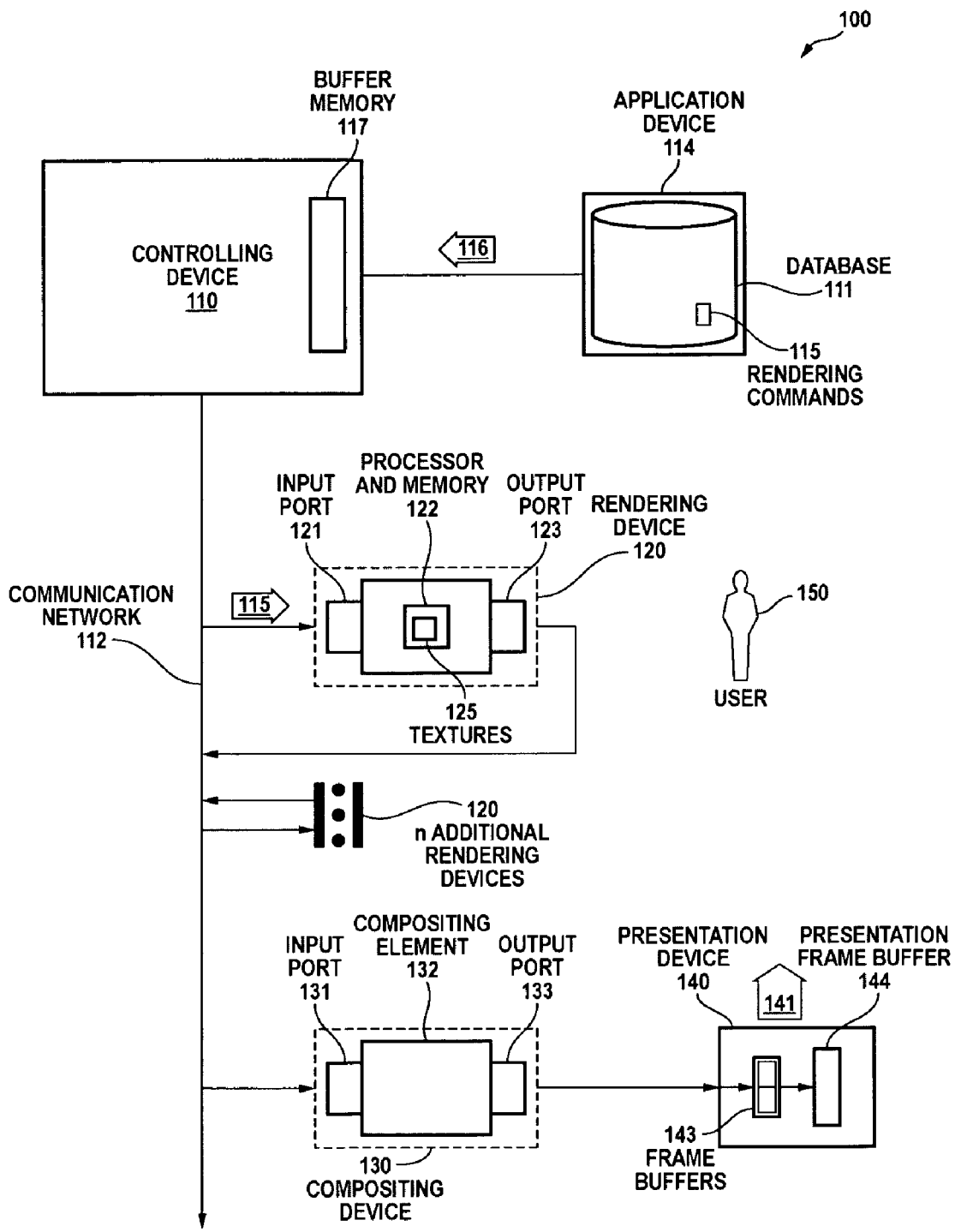
FIG. 1 shows a block diagram of a system including a controlling device and a set of rendering devices.

This application incorporates by reference and claims priority of at least the following documents.

application Ser. No. 60/676,241, filed Apr. 29, 2005, in the name of inventor Thomas Ruge, titled "Compression of Streams of Rendering Commands", application Ser. No. 60/676,254, filed Apr. 29, 2005, in the name of inventor Thomas Ruge, titled "Alpha Blending", application Ser. No. 60/676,240, filed Apr. 29, 2005, in the name of inventor Thomas Ruge, titled "Scene Splitting for perspective Presentations", These documents are hereby incorporated by reference as if fully set forth herein, and are sometimes referred to herein as the "incorporated disclosures". Inventions described herein can be used in combination or conjunction with technology described in the incorporated disclosures.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

DEFINITIONS

The general meaning of each of these following terms is intended to be illustrative and in no way limiting.

The phrases (1) "controlling device", (2) "rendering device", and the like, refer respectively to devices for (1) controlling the allocation of rendering commands, and (2) actually rendering 3D scenes and 2D images of a front of those 3D scenes from a selected rendering viewpoint, as further described below.

However, in the context of the invention, there is no particular requirement of having only a single controlling device or of having a specified number of rendering devices. Moreover, in alternative embodiments, in appropriate circumstances the controlling device might take on the role of a rendering device, or one or more rendering devices might take on the role of the controlling device.

The phrases (1) "compositing device", (2) "presentation device", and the like, refer respectively to devices (1) for composing 2D images in response to a 3D scene, or for composing a single 2D image from multiple 2D images, and (2) for making a presentation to a user in response to one or more 2D images, as further described below.

In one embodiment, a "2D image" includes a set of information for 2D presentation, such as for example pixel values for color (e.g., red, green, and blue) or a set of presentable polygons or vectors. In the context of the invention, there is no particular requirement of any one selected representation of a 2D image, nor is there any particular requirement of actually presenting the 2D image to a user.

In the context of the invention, there is also no particular requirement of having any particular number of presentation devices, or even having any presentation devices at all. In alternative embodiments, the 2D image might be transmitted to another computing device for additional processing before, or instead of, actually being presented to a user.

However, in the context of the invention, there is no particular requirement of having only a single compositing device, only a single presentation device, or of having a specified number of rendering devices. There is also no particular requirement that the compositing devices or the presentation devices are not also performing the roles of the controlling device or the rendering devices. In one embodiment, for example, the controlling device might take on the role of a compositing device.

The phrases "rendering viewpoint", "front of the scene", and the like, refer to concepts relating to a view of the 3D scenes by the user.

The 3D scene is presented as if it is viewed from the "rendering viewpoint". In one embodiment, the rendering viewpoint might be static, or might be dynamic, such as in response to (1) controls by a user, (2) a set of sensors, such as motion sensors focused on the user, (3) a time-varying parameter, such as in a roller-coaster ride, and the like. The "front" of a 3D scene is that 2D image presented as if the viewer were at the rendering viewpoint.

The phrases "rendering command", "sequences of rendering commands", "streams of rendering commands", and the like, refer to commands to the rendering devices for rendering 3D scenes, as further described below.

The sets of rendering commands include information about what objects are to be represented in the 3D scene, including such information as where objects are placed in a defined 3D volume, what they look like, and what their effects are on viewing other such objects (i.e., whether they are opaque, transparent, translucent, reflective, and the like).

In one embodiment, a set of rendering commands might include commands from the "DirectX" or the "OpenGL" set of rendering commands. The controlling device, responsive to the 3D scene, sends sets of such rendering commands, possibly formatted as sequences or streams thereof, to the rendering devices. As described below, in one embodiment, the controlling device attempts to compress the sets of such rendering commands before sending them, with the effect of being able to complete the operating of sending to each rendering device within a selected time limit.

However, in the context of the invention, there is no particular requirement of using relatively high-level rendering commands such as DirectX or OpenGL rendering command sets. In alternative embodiments, the controlling device might compile or interpret relatively higher-level rendering commands such as DirectX or OpenGL rendering commands into relatively lower-level rendering commands such as a RISC-like rendering command set, with the possible effect that it might be more effective to compress sets of such lower-level rendering commands.

The phrases "frame duration", "rendering time", "frame rate", "frame buffer", and the like, refer to timing and frequency issues taken into account by the rendering devices when rendering 3D scenes, as further described below.

As described herein, each rendering device both receives its set of rendering commands and renders its portion of the 3D scene within a selected time limit, with the effect that the 3D scene (and its associated 2D images) can be presented to the user sufficiently quickly to appear as a smooth motion picture. In one embodiment, the selected time limit is sufficiently short so that 2D image frames can be presented at a frame rate of about 60 frames per second. Thus, each frame should have a frame duration of no more than about 1/60 second (about 16 milliseconds), including both (1) transfer time for sending rendering commands from the controlling device to the rendering device, and (2) rendering time for rendering each frame into a 2D image by the rendering device.

The phrases "presentation frame", "hidden frames", and the like, refer to multiple-buffering and pipelining techniques used by the rendering devices when rendering 3D scenes, as further described below.

As described herein, the compositing device combines the portions of the 3D scene as rendered by each rendering device. The compositing device maintains multiple frames, of which one "presentation frame" is accessible to the presentation device and presented to the user. Others of those multiple frames are "hidden frames", which are not accessible to the presentation device until they are completed and ready for presentation to the user. This has the effect that the 3D scene (and its associated 2D images) can be presented to the user sufficiently quickly to appear as a smooth motion picture.

In one embodiment, there is one presentation frame and one hidden frame. However, in the context of the invention, there is no particular requirement of any specific number of hidden frames.

The term "compression" and the phrases "compression of streams of rendering commands", and the like, refer to attempts by the controlling device (or by an assisting device disposed for the purpose of compression) to reduce the amount of network bandwidth involved in sending rendering commands to the rendering devices, as further described below.

For example, in the oil and gas industry, the number of rendering commands might occupy as much as 50 gigabytes of information, but involve a great deal of redundancy. Principles of information theory imply that the same information might be sent from the controlling device to the rendering devices without involving the actual transfer, at network data transmission rates, of 50 gigabytes of data.

The inventor has found that, in practice, about 90-95% of all rendering commands actually sent by a controlling device to the rendering devices are identical or nearly identical as the previous frame. Accordingly, a substantial reduction in the amount of network bandwidth involved in sending rendering commands can be achieved by allowing the controlling device to send rendering commands of the form "the same as before".

Similarly, of those rendering commands that are not identical or nearly identical as the previous frame, a substantial fraction involve only altering an object in the 3D scene slightly, such as for example moving or rotating that object, changing its color or transparency, and the like. Accordingly, a substantial reduction in the amount of network bandwidth involved in sending rendering commands can be achieved by allowing the controlling device to send rendering commands of the form "the same as before, except for the following change".

As described below, there are many possible techniques by which the controlling device might substantially reduce the amount of network bandwidth involved in sending rendering commands to the rendering devices. Some of these possible techniques are described in further detail below. In one embodiment, for example, sets of rendering commands might be cached by the controlling device and associated with a relatively short label, with the effect that the controlling device can send those rendering commands again using only a repeat of that relatively short label. However, as noted below, in the context of the invention, there is no particular requirement that this, or any other particular technique, is used for compression of sets of rendering commands.

The phrases "network bandwidth", and the like, refer to a rate at which the controlling device and the rendering devices might exchange information, or similarly, a rate at which the rendering devices might exchange information with other rendering devices where appropriate. Network bandwidth is generally described below with respect to a total amount of data sent during a selected unit of time. Principles of information theory imply that network bandwidth is limited by the physical nature of communication equipment, techniques for using that communication equipment, and an amount of noise present when data is sent using that communication equipment, as further described below.

The scope and spirit of the invention is not limited to any of these definitions, or to specific examples mentioned therein, but is intended to include the most general concepts embodied by these and other terms.

System Elements

FIG. 1 shows a block diagram of a system including a controlling device and a set of rendering devices.

A system 100 includes elements as shown in FIG. 1, plus possibly other elements as described in the incorporated disclosure. These elements include at least a controlling device 110, a set of rendering devices 120, an (optional) compositing device 130, and an (optional) presentation device 140.

Controlling Device

The controlling device 110 includes elements as shown in FIG. 1, plus possibly other elements as described in the incorporated disclosure. These elements include at least a model or database ill, a communication network 112, and a set of rendering commands 115.

In one embodiment, the model or database ill is maintained in an application device 114 (such as for example a separate hardware device, or such as for example an application program executing at least in part on the same hardware device as the controlling device 110. The application device 114 sends a set of rendering commands 115 from the model or database ill to the controlling device 110.

In one embodiment, the application device 114 wraps one or more rendering commands 115, such as for example OpenGL commands, in one or more data packets 116, the data packets 116 each having a wrapper and a payload, where the payload includes the one or more rendering commands. Similarly, the controlling device 110 receives the data packets 116, parses those one or more data packets 116 to distinguish the wrapper from the payload, with the effect of receiving the one or more rendering commands 115.

The controlling device 110 buffers the rendering commands 115 in a buffer memory 117 accessible to it, and determines if those rendering commands 115 can be compressed for sending to the rendering devices 120. As noted above, there are many different possible techniques capable of achieving substantial compression of the rendering commands 115, including at least the following:

The controlling device 110 might cache earlier sets of rendering commands 115, associating each such set of rendering commands 115 with a relatively short label, and sending that relatively short label as an indicator involving repetition of that set of rendering commands 115.

In embodiments involving caching earlier sets of rendering commands 115, the choice of how many, and which ones, of a number of earlier sets of rendering commands 115 itself might be optimized to the particular sets of rendering commands 115, or might be adaptively optimized as the particular sets of rendering commands 115 vary with time.

In one embodiment, for example, the controlling device 110 might cache a number of sets of rendering commands 115 responsive to the size of those sets of rendering commands. A number of distinct techniques might include, for example, one or more of the following.

caching up to a maximum size of the buffer memory 117;

caching sets of rendering commands 115 in response to a Liv-Zempel technique;

caching sets of rendering commands 115 in response to their relative age in past frame times;

caching sets of rendering commands 115 in response to their relative size in time needed to send them again.

The controlling device 110 couples the set of rendering commands 115, as compressed, to the communication network 112, with the effect of sending those rendering commands 115 to the rendering devices 120.

Rendering Devices

The rendering devices 120 each include elements as shown in FIG. 1, plus possibly other elements as described in the incorporated disclosure. These elements include, for each rendering device 120, at least an input port 121, a processor and memory 122, and an output port 123.

A set of textures 125 can be stored in the memory of the processor and memory 122 and used as explained herein. In an embodiment of the invention, the rendering device 110 can include a memory separate from the processor and memory 122 specifically to store textures 125 at the rendering device 110. The memory portion of the processor and memory 122 is sometimes referred to herein as the "memory 122."

Each rendering device 120 has its input port 121 coupled to the communication network 112, with the effect that each rendering device 120 might receive its set of rendering commands 115, in a compressed form, from the controlling device 110.

Each rendering device 120, in response to its set of rendering commands 115, uses its processor and memory 122 to perform at least the following.

decompressing those rendering commands 115;

parsing those rendering commands 115;

rendering those rendering commands 115, with the effect of generating its portion of the 3D scene and its portion of the associated 2D image.

In one embodiment, decompressing and parsing those rendering commands 115 includes recognizing information embedded in each set of rendering commands 115 indicative of compressed rendering commands 115. In preferred embodiments, there are at least two different techniques that might be used, in cooperation, by the controlling device 110 and the rendering devices 120.

In a first technique, using a first form of Liv-Zempel compression, the controlling device 110 might embed information in each set of rendering commands 115 indicative of an abbreviation for a selected set of rendering commands 115 (with or without parameters selected by the controlling device 110 for those sequences of rendering commands 115). In this first technique, each rendering device 120 determines the presence of an abbreviation by (1) a first selected data sequence defining the abbreviation, and (2) a second selected data sequence using the abbreviation.

In a second technique, using a second form of Liv-Zempel compression, the controlling device 110 might cache its own abbreviations for selected sets of rendering commands 115 (again, with or without parameters selected by the controlling device 110 for those sequences of rendering commands 115), while the rendering devices 120 each perform the same technique. In this second technique, there is no particular requirement for a first selected data sequence defining an abbreviation, as both the controlling device 110 and the rendering devices 120 each maintain the same abbreviations (albeit independently). Rather, the controlling device 110 need only use the second selected data sequence using the abbreviation.

Each rendering device 120 couples its rendered 2D image to its output port 123.

If the system 100 includes (optional) compositing devices 130, this has the effect of sending that 2D image to the compositing devices 130. If the system 100 does not include any compositing devices 130, but does include (optional) presentation devices 140, this has the effect of sending that 2D image to the presentation devices 140. If the system 100 does not include any compositing devices 130 or presentation devices 140, this has the effect of sending that 2D image to the controlling device 110.

Compositing Devices

The system 100 also optionally includes a compositing device 130, plus possibly other elements as described in the incorporated disclosure. The compositing device 130 includes elements as shown in FIG. 1. These elements include at least an input port 131, a compositing element 132, and an output port 133.

The compositing device 130 has its input port 131 coupled to the communication network 112, with the effect that each compositing device 130 might receive the 2D images from the rendering devices 120.

The compositing device 130 couples its rendered 2D image to its output port 123.

The compositing device 130 uses its compositing element 132 to combine the 2D images from each of the rendering devices 120, with the effect of generating a unified 2D image. In one embodiment, the compositing element 132 includes a processor and memory, with the processor performing instructions to accomplish this step; however, in some embodiments, the compositing element 132 may include specialized hardware, either in combination with or instead of, a processor and memory.

If the system 100 includes (optional) presentation devices 140, this has the effect of sending that 2D image to the presentation devices 140. If the system 100 does not include any presentation devices 140, this has the effect of sending that 2D image to the controlling device 110.

Presentation Device

The system 100 also optionally includes a presentation device 140. The presentation device 140 is coupled to a combined 2D image 141 (as represented by data in memory, storage, or a signal) made available at the output port 133 of the compositing device 130, and is capable of presenting that 2D image 141 to a user 150.

The presentation device 140 is coupled to the communication network 112, with the effect that the presentation device 140 might receive the combined 2D image 141 from the rendering devices 120 or from the compositing device 130.

The presentation device 140 couples the combined 2D image 141 to one of a set of hidden frame buffers 143. One or more hidden frame buffers 143 are queued behind a presentation frame buffer 144. In one embodiment, there is only a single hidden frame buffer 143; however, in alternative embodiments, there may be more than one hidden frame buffer 143. The effect of queuing the hidden frame buffers 143 is that the rendering devices 120 or the compositing device 130 might lag actual presentation of the combined 2D image 141 to the user 150.

The presentation device 140 couples the combined 2D image 141 from the presentation frame buffer 144 to the user 150. This has the effect of presenting the combined 2D image 141 to the user 150.

User

Although the user 150 is shown herein as a person, in the context of the invention, there is no particular requirement that the user 150 is so limited. The user 150 might include a group of people, a computer imaging or motion detection program, an image compression program such as JPEG or MPEG, a system including a broadcast or other distribution system for images, an analysis program for 2D images 141, or even an artificial intelligence program capable of reviewing 2D images 141.

Timing Diagram

Figure 2:
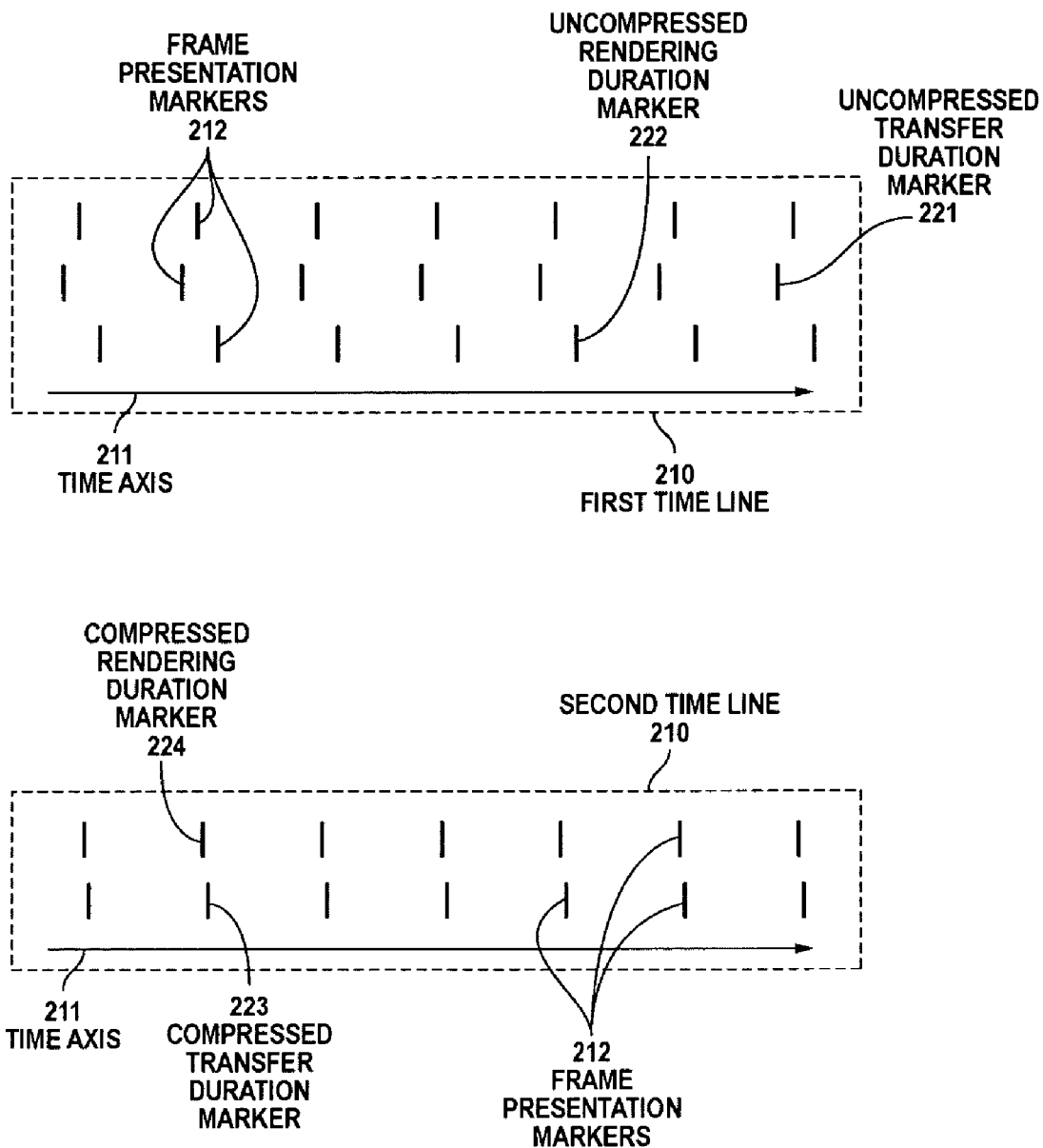
FIG. 2 shows a conceptual diagram of timing in a system including a controlling device and a set of rendering devices.

FIG. 2 shows a conceptual diagram of timing in a system including a controlling device and a set of rendering devices.

Timing concepts in the system 100 include elements as shown in FIG. 2, plus possibly other elements as described in the incorporated disclosure. These elements include at least a first time line 210 indicative of frame presentation times, and a second time line 220 indicative of (compressed) rendering command transfer and processing times.

Frame Presentation Times

Timing concepts with respect to the first time line 210 include elements as shown in FIG. 2, plus possibly other elements as described in the incorporated disclosure. These elements include a time axis 211 and a set of frame presentation markers 212, each indicative of when a frame should be ready for presentation to the user 150.

The time axis 211 indicates an amount of time. Each frame presentation marker 212 is equally spaced, indicating that each frame should be an equal, or nearly equal, amount of time. In one embodiment, each frame includes 1/60 second during which the presentation device 140 presents the combined 2D image 141 to the user 150.

Transfer and Processing Times

Timing concepts with respect to the first time line 220 include elements as shown in FIG. 2, plus possibly other elements as described in the incorporated disclosure. These elements include a set of (uncompressed) transfer duration markers 221 and a set of (uncompressed) rendering duration markers 222. These elements also include a set of (compressed) transfer duration markers 223 and a set of (compressed) rendering duration markers 224.

Each (uncompressed) transfer duration marker 221 indicates a time duration when the controlling device 110 sends (uncompressed) rendering commands for a selected frame to the rendering devices 120. Each (uncompressed) rendering duration marker 222 indicates a time duration when the rendering devices 120 parse and render that selected frame.

Similarly, each (compressed) transfer duration marker 223 indicates a time duration when the controlling device lo sends (compressed) rendering commands for a selected frame to the rendering devices 120. Each (compressed) rendering duration marker 224 indicates a time duration when the rendering devices 120 decompress, parse, and render that selected frame.

For some frames, and in some cases for only some rendering devices 120 for those frames, the sum of the time duration for (1) sending the uncompressed rendering commands and (2) parsing and rendering that frame, is greater than (3) the frame duration time. Equation 231 represents this circumstance.

$$t_{1,\ uncompressed} + t_{2,\ uncompressed} > t_3 \qquad (231)$$

For those frames, the new combined 2D image 141 will not be ready in time for the exchange of the presentation frame buffer 144 and one of the hidden frame buffers 143, as described above with respect to FIG. 1. This would have the effect of presenting the earlier combined 2D image 141 again, itself possibly having an effect on the user 150.

In one embodiment, for all frames, the time duration for sending the compressed rendering commands is substantially less than for sending uncompressed rendering commands. While it might take slightly more time to uncompress and parse the compressed rendering commands, in contrast with just parsing uncompressed rendering commands, the total time duration for (1) sending the compressed rendering commands and (2) uncompressing, parsing and rendering that frame, is less than (3) the frame duration time. Equation 232 represents this circumstance.

$$t_{1,\ compressed} + t_{2,\ compressed} \leq t_3 \qquad (232)$$

This has the effect that, for all frames, the new combined 2D image 141 will always be ready in time for the exchange of the presentation frame buffer 144 and one of the hidden frame buffers 143, as described above with respect to FIG. 1.

Method of Operation

Figure 3:
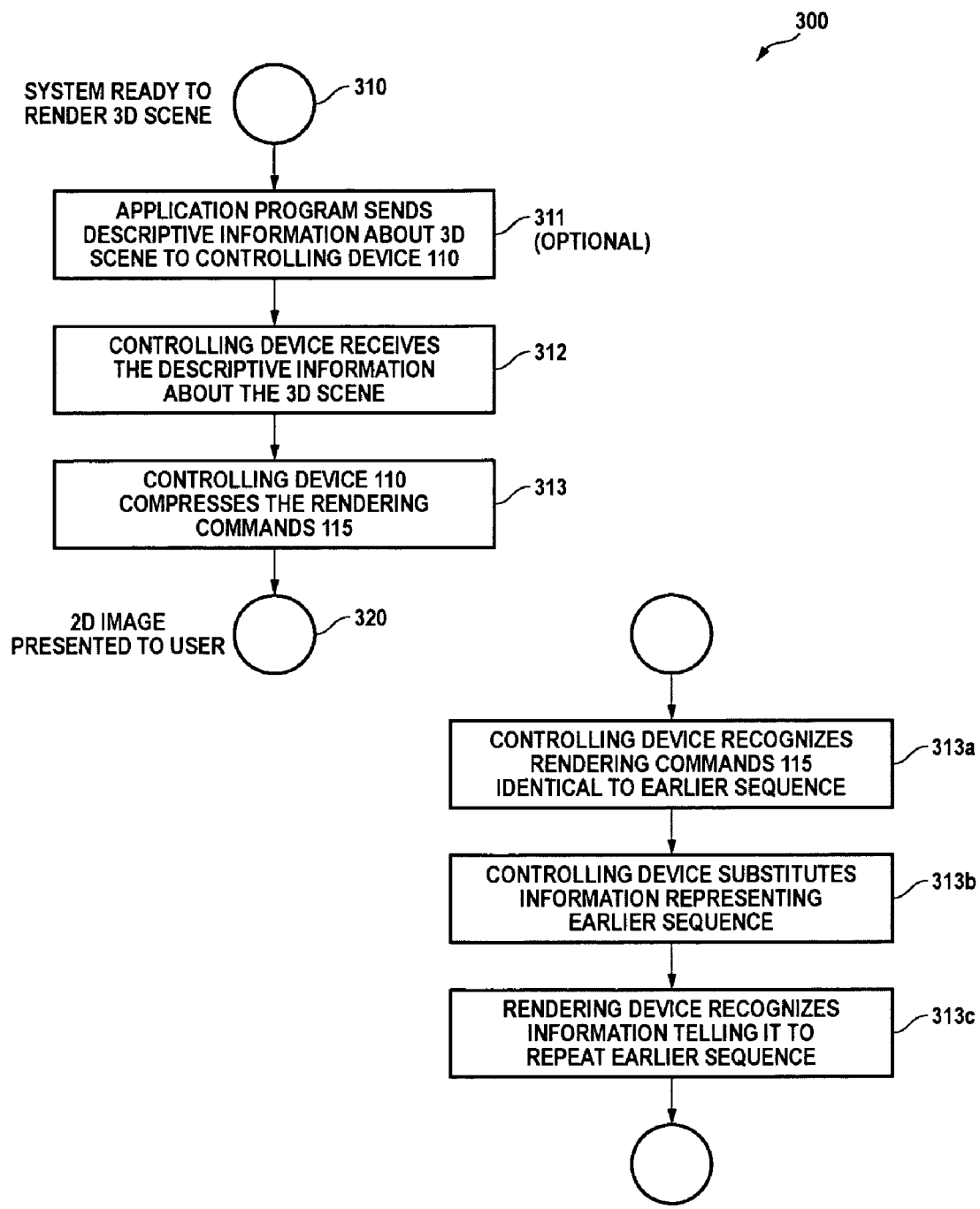
FIG. 3 shows a process flow diagram of a method using compression of streams of rendering commands.

FIG. 3 shows a process flow diagram of a method using compression of streams of rendering commands.

Although described serially, the flow points and method steps of the method 300 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

The method 300 includes flow points and process steps as shown in FIG. 3, plus possibly other flow points and process steps as described in the incorporated disclosure. These flow points and process steps include at least the following:

At a flow point 310, the method 300 is ready to render a 3D scene and present a 2D image of that scene to a user.

As described herein, in the context of the invention, there is no particular requirement for the system 100 or the method 300 to perform an initialization step to reach any particular state. One effect of the compression and decompression technique is that the controlling device 110 and the rendering devices 120 should logically synchronize within no more than about a few frames. This should have the effect that the user 150 should see no more than a short duration of visual noise.

At an (optional) step 311, the application program sends descriptive information about the 3D scene to the controlling device 110, wrapped in message packets that include the rendering commands 115 as payload data.

In one embodiment, the descriptive information might take the form of rendering commands 115, such as for example DirectX commands or OpenGL commands.

In the context of the invention, there is no particular requirement for the system 100 or the method 300 to include any particular method for applications to send information with respect to the 3D scene to the controlling device 110. For example, in alternative embodiments, the application may share a memory with the controlling device 110, and cause the controlling device 110 to be aware of changes to the 3D scene using a blackboard model of communication. After reading this application, those skilled in the art will recognize many other and further techniques by which the application and the controlling device 110 might communicate.

At a step 312, the controlling device 110 receives the descriptive information about the 3D scene, and generates a set of rendering commands 115 to send to the rendering devices 120.

In one embodiment, if the descriptive information already includes rendering commands 115, albeit wrapped in message packets as payload data, the controlling device 110 simply parses those message packets to extract the rendering commands 115 as a separate set of information.

At a step 313, the controlling device 110 compresses the rendering commands 115.

In one embodiment, the system 100 performs this step using the following sub-steps.

At a sub-step 313(a), the controlling device 110 recognizes a sequence of rendering commands 115 that is identical to an earlier sequence of rendering commands 115.

In one embodiment, the controlling device 110 uses a Liv-Zempel form of compression, with the effect that the controlling device 110 has a cache of such sequences of rendering commands 115. Accordingly, the controlling device 110 might search its cache, or an associative memory taking on the role of a cache, for that sequence of rendering commands 115.

At a sub-step 313(b), the controlling device 110 substitutes information representing that earlier sequence of identical rendering commands 115.

This has the effect of telling the rendering devices 120 to repeat the earlier sequence of rendering commands 115.

If the earlier sequence of rendering commands 115 is nearly identical, but not exactly identical, the controlling device 110 might be able to substitute the earlier sequence of identical rendering commands 115, but with a selected parameter. In such cases, the controlling device 110 also sends that selected parameter to the rendering devices 120.

At a sub-step 313(c), the rendering devices 120 recognize the information telling them to repeat the earlier sequence of rendering commands 115. Upon recognition of that information, the rendering devices 120 each render their portion of the 2D image as if the controlling device 1lo had sent the entire earlier sequence of rendering commands 115.

In embodiments where the controlling device 110 uses a Liv-Zempel form of compression, the rendering devices 120 update their own caches with information associating the particular sequences of rendering commands 115 with its abbreviation.

At a flow point 320, the method 300 has completed rendering a 3D scene and presenting a 2D image of that scene to a user 150.

In one embodiment, the system 100 repeats the method 300 until stopped, rapidly enough that the user 170 sees the 2D image 141 as a motion picture.

This has the effect that the user 170 perceives the 3D scene itself as a model of a virtual reality. In such embodiments, the model might be responsive to user inputs or other inputs, with the effect that the 3D scene and the rendering viewpoint might change rapidly with time, and with the effect that the user 170 would perceive a view very much like actually interacting with a virtual reality as defined by the model.

In alternative embodiments, the controlling device lo might use other and further forms of compression, such as choosing to cache only the n most recent sequences of rendering commands 115. In such embodiments, the parameter n might be selected in response to (1) a degree of repetition in the set of rendering commands 115, (2) an amount of memory available to the controlling device 110 or the rendering devices 120, (3) an amount of memory to maintain the 3D scene, (4) other and further factors. In such embodiments, the decision of whether a sequence of rendering commands 115 is "recent" might be selected in response to (1) a number of repetitions of that sequence, (2) an amount of memory to maintain that sequence, (3) an amount of time since that sequence has last been used, (4) an amount of time to send that sequence, (5) other and further factors.

Texture Naming 3D applications use textures 125 for mapping complex surfaces onto 3D geometry (e.g. car paint on a car's body). These textures 125 can be very big, therefore it is expensive (i.e. takes a long time) to send the textures 125 to all the rendering devices 120 every time the controlling device 110 needs the rendering devices 120 to render them.

In an embodiment of the invention, the set of textures 125 is stored in the memory 122 of the rendering devices 120. Textures 125 are named (or given a unique reference) so that the controlling device 110 need only send the reference to identify the texture 125 to be used instead of the entire content of the texture 125. This saves time by reducing the amount of data sent from the controlling device 110 to the rendering devices 120.

Vertex Call Conversion 3D applications use vertices to describe the geometry of a 3D object. While modern 3D languages or SDK's (Software Development Kit) provide efficient ways to store large amounts of vertices in Arrays (Vertex Arrays), 3D applications often use individual vertex calls, which is inefficient (i.e. takes long time) due to its large size comparable to vertex arrays.

The system 100 can convert on the fly long chains of individual vertex calls into vertex arrays and therefore reduce the amount of vertex data the controlling device 110 has to send to the rendering devices 120. Since this reduces the amount of data sent from the controlling device 110 to the rendering device 120 significant time is saved.

ALTERNATIVE EMBODIMENTS

Although preferred embodiments are disclosed herein, many variations are possible which remain within the concept, scope, and spirit of the invention. These variations would become clear to those skilled in the art after perusal of this application.

After reading this application, those skilled in the art will recognize that these alternative embodiments and variations are illustrative and are intended to be in no way limiting. After reading this application, those skilled in the art would recognize that the techniques described herein provide an enabling technology, with the effect that advantageous features can be provided that heretofore were substantially infeasible.

The invention claimed is:

1. A method, including steps of sending a set of rendering commands, from a controlling device to a set of rendering devices, within a selected frame duration; when the set of rendering commands cannot be received by the set of rendering devices within the selected frame duration, performing the steps of compressing the set of rendering commands before they are received at the set of rendering devices, wherein compressed rendering commands can be received at the set of rendering devices within the selected frame duration; caching sequences of rendering commands that are relatively duplicative of earlier such sequences at the controlling device; and rendering a scene including a moving object within a background of scenery including the steps of sending a relatively shorter command to at least some of the set of rendering devices directing the at least some of the set of rendering devices to render the same scenery as in an earlier sequence of rendering commands, and sending other commands with respect to the moving object.

2. The method as in claim 1, wherein the controlling device includes a database, a communication network, and the set of rendering commands.

3. The method as in claim 2, wherein the database is maintained in an application device that sends the set of rendering commands from the database to the controlling device.

4. The method as in claim 3, wherein the application device wraps the set of rendering commands in at least one data packet, each data packet having a wrapper and a payload, where the payload includes the set of rendering commands.

5. The method as in claim 4, wherein the controlling device receives the at least one data packet and parses the at least one data packet to distinguish the wrapper from the payload to receive the set of rendering commands.

6. The method as in claim 1, wherein caching the sequences of rendering commands include at least one of caching up to a maximum size of a buffer memory, caching the set of rendering commands in response to a Liv-Zempel technique, caching the set of rendering commands in response to a relative age of the set of rendering commands in past frame times, and caching the set of rendering commands in response to the relative size of the set of rendering commands in time needed to send the set of rendering commands again.

7. The method as in claim 1, wherein each rendering device in the set of rendering devices includes at least one input port, a processor, a memory, and an output port.

8. The method as in claim 7, wherein each rendering device, in response to the set of rendering commands, uses the processor and the memory to decompress the set of rendering commands, parse the set of rendering commands, and render the set of rendering commands to generate a portion of a 3D scene and a portion of an associated 2D image.

9. The method as in claim 1, wherein a total time duration for sending the compressed rendering commands, uncompressing the compressed rendering commands, parsing the set of rendering commands, and rendering a frame is less than the selected frame duration.

10. A method, including steps of sending a set of rendering commands, from a controlling device to a set of rendering devices, within a selected frame duration; when the set of rendering commands cannot be received by the set of rendering devices within the selected frame duration, performing the steps of compressing the set of rendering commands before they are received at the set of rendering devices, wherein compressed rendering commands can be received at the set of rendering devices within the selected frame duration; caching sequences of rendering commands that are relatively duplicative of earlier such sequences at the controlling device; and rendering a scene including a moving object within a background of scenery including the steps of sending a relatively shorter command to at least some of the set of rendering devices directing the at least some of the set of rendering devices to render the moving object as in an earlier sequence of rendering commands; but wherein the at least some of the set of rendering devices are directed to render the moving object differently with respect to at least one of: position, viewing angle, or other parameters.

11. The method as in claim 10, wherein the controlling device includes a database, a communication network, and the set of rendering commands.

12. The method as in claim 11, wherein the database is maintained in an application device that sends the set of rendering commands from the database to the controlling device.

13. The method as in claim 12, wherein the application device wraps the set of rendering commands in at least one data packet, each data packet having a wrapper and a payload, where the payload includes the set of rendering commands.

14. The method as in claim 13, wherein the controlling device receives the at least one data packet and parses the at least one data packet to distinguish the wrapper from the payload to receive the set of rendering commands.

15. The method as in claim 10, wherein caching the sequences of rendering commands include at least one of caching up to a maximum size of a buffer memory, caching the set of rendering commands in response to a Liv-Zempel technique, caching the set of rendering commands in response to a relative age of the set of rendering commands in past frame times, and caching the set of rendering commands in response to the relative size of the set of rendering commands in time needed to send the set of rendering commands again.

16. The method as in claim 10, wherein each rendering device in the set of rendering devices includes at least one input port, a processor, a memory, and an output port.

17. The method as in claim 16, wherein each rendering device, in response to the set of rendering commands, uses the processor and the memory to decompress the set of rendering commands, parse the set of rendering commands, and render the set of rendering commands to generate a portion of a 3D scene and a portion of an associated 2D image.

18. The method as in claim 10, wherein a total time duration for sending the compressed rendering commands, uncompressing the compressed rendering commands, parsing the set of rendering commands, and rendering a frame is less than the selected frame duration.

* * * * *